(12) United States Patent
Wolf et al.

(10) Patent No.: US 8,032,256 B1
(45) Date of Patent: Oct. 4, 2011

(54) LIQUID LEVEL CONTROL SYSTEMS

(75) Inventors: Aaron R. Wolf, Ashland, OH (US);
William D. Chandler, Jr., Ashland, OH (US)

(73) Assignee: SJE-Rhombus, Detroit Lakes, MN (US)

( * ) Notice: Subject to any disclaimer, the term of this patent is extended or adjusted under 35 U.S.C. 154(b) by 335 days.

(21) Appl. No.: 12/425,989

(22) Filed: Apr. 17, 2009

(51) Int. Cl.
| | |
|---|---|
| G05D 9/00 | (2006.01) |
| G01F 1/00 | (2006.01) |
| G01F 7/00 | (2006.01) |
| G01F 17/00 | (2006.01) |
| G01F 23/00 | (2006.01) |
| G01F 25/00 | (2006.01) |
| G01F 19/00 | (2006.01) |
| G01L 7/00 | (2006.01) |
| G01N 11/00 | (2006.01) |
| G01P 21/00 | (2006.01) |
| F16K 37/00 | (2006.01) |
| E03B 7/07 | (2006.01) |
| B01D 21/30 | (2006.01) |
| F17D 3/00 | (2006.01) |
| G08B 21/00 | (2006.01) |
| F04F 1/18 | (2006.01) |
| F04F 1/06 | (2006.01) |
| F04F 3/00 | (2006.01) |

(52) U.S. Cl. ............... 700/281; 702/47; 702/51; 702/55; 73/1.31; 73/1.73; 73/290 R; 137/552.7; 137/557; 137/558; 210/138; 210/143; 340/614; 340/618; 340/626; 417/38; 417/116; 417/120; 417/125; 417/138

(58) Field of Classification Search ................... 700/275, 700/281, 282; 702/45, 47, 50, 51, 55; 73/1.31, 73/1.73, 290 R; 137/386, 391, 393, 395–399, 137/409–413, 426, 551, 552.7, 557, 558, 137/561 R, 565.01, 565.11, 565.13, 624.11; 166/53, 373, 374; 210/97, 103, 104, 121, 210/123, 130, 138, 143; 241/33, 36; 340/500, 340/540, 603, 312, 314, 618, 626; 417/25, 417/26, 36, 38, 116, 118, 120, 125, 137, 417/138, 211.5

See application file for complete search history.

(56) References Cited

U.S. PATENT DOCUMENTS 4,919,343 A * 4/1990 Van Luik et al. ............... 241/36
5,059,954 A * 10/1991 Beldham et al. ............. 340/614
(Continued)

FOREIGN PATENT DOCUMENTS

JP 04014521 A * 1/1992
(Continued)

*Primary Examiner* — Crystal J Barnes-Bullock
(74) *Attorney, Agent, or Firm* — Christopher L. Parmelee; Walker & Jocke (57) ABSTRACT

A system that control levels of liquids in reservoirs may include a control component that causes a compressor to pump gas through a tube extending in a liquid in a reservoir to an air bell for a predetermined amount of time responsive to a pump pumping portions of a liquid from the reservoir. The control component may also cause the compressor to pump gas through the tube for a predetermined amount of time responsive to the control component determining that a predetermined amount of time has passed since the compressor was previously operated. The control component may also cause the compressor to pump gas through the tube for a predetermined amount of time, responsive to the control component determining that a pressure sensor component in fluid communication with the tube indicates a possible decrease in the liquid level to at least a predetermined level.

15 Claims, 6 Drawing Sheets

U.S. PATENT DOCUMENTS

| | | | | |
|---|---|---|---|---|
| 5,069,243 | A * | 12/1991 | Foreman | 137/205 |
| 5,261,276 | A * | 11/1993 | Gifford | 73/302 |
| 5,351,725 | A * | 10/1994 | Suthergreen et al. | 141/1 |
| 5,439,180 | A * | 8/1995 | Baughman et al. | 241/36 |
| 5,749,711 | A * | 5/1998 | Park | 417/120 |
| 5,938,409 | A * | 8/1999 | Radle et al. | 417/133 |
| 6,368,068 | B1 * | 4/2002 | Corlew et al. | 417/120 |
| 6,443,005 | B1 | 9/2002 | Chandler | |
| 6,446,014 | B1 * | 9/2002 | Ocondi | 702/45 |
| 6,490,919 | B2 * | 12/2002 | Bilinski et al. | 73/299 |
| 6,595,051 | B1 | 7/2003 | Chandler | |
| 6,672,200 | B2 * | 1/2004 | Duffy et al. | 99/283 |
| 6,763,714 | B2 * | 7/2004 | Molina et al. | 73/302 |
| 6,817,419 | B2 * | 11/2004 | Reid | 166/369 |
| 7,011,505 | B2 * | 3/2006 | Muhs | 417/200 |
| 7,075,443 | B1 | 7/2006 | Chandler et al. | |
| 7,188,613 | B2 * | 3/2007 | Miura et al. | 123/516 |
| 7,224,283 | B1 | 5/2007 | Chandler et al. | |
| 7,558,699 | B2 * | 7/2009 | Beck et al. | 702/182 |
| 7,855,345 | B2 * | 12/2010 | Stevens et al. | 200/83 S |
| 7,869,978 | B2 * | 1/2011 | Anderson et al. | 702/182 |
| 7,901,190 | B2 * | 3/2011 | Gray | 417/22 |
| 7,931,447 | B2 * | 4/2011 | Levin et al. | 417/38 |
| 2008/0290011 | A1 * | 11/2008 | Capano et al. | 210/104 |
| 2009/0123295 | A1 * | 5/2009 | Abbott | 417/36 |
| 2009/0250395 | A1 * | 10/2009 | Aker et al. | 210/626 |

FOREIGN PATENT DOCUMENTS

| | | | |
|---|---|---|---|
| JP | 06057811 A | * | 3/1994 |
| JP | 2007078413 A | * | 3/2007 |

* cited by examiner

LIQUID LEVEL CONTROL SYSTEMS

BACKGROUND

The present invention relates to systems that control levels of liquids in reservoirs. Specifically this invention relates to liquid level sensing and control systems for wastewater systems.

It is often desirable to know information about liquid levels in tanks. Determining liquid levels and controlling liquid levels in reservoirs, such as in sewage tanks, wells, water cisterns or tanks, and other liquid systems and storage vessels, whether enclosed or open and exposed to the environment, has been done in a number of ways. For example, in tanks that are visually accessible, an operator may periodically take visual readings of the liquid level.

Visual readings, however, are often not desirable in systems where an automatic response is required when the liquid level reaches a certain threshold. In such cases the activation of a pump or valve may be necessary to move more liquid into the tanks or to discharge liquid from the tank. In systems where visual readings are not available or when an immediate response is required, control systems are typically employed that are responsive to a liquid level indication. Such control systems may illuminate a light on an indicator panel representing the liquid level and/or trip an audible alarm to notify a human operator that corrective action is required.

Examples of liquid level sensing devices for use with wastewater reservoirs or other liquid holding vessels or tanks are discussed in U.S. Pat. No. 6,595,051 of Jul. 22, 2003; U.S. Pat. No. 6,443,005 of Sep. 3, 2002; U.S. Pat. No. 7,075,443 of Jul. 11, 2006; and U.S. Pat. No. 7,224,283 of May 29, 2007, which are all hereby incorporated by reference herein.

SUMMARY

The following is a brief summary of subject matter that is described in greater detail herein. This summary is not intended to be limiting as to the scope of the claims.

An example liquid level control system may include a liquid level sensor device in the form of an air bell that is positioned within a reservoir such as a wastewater tank or other container, at a level that is below the upper surface of the liquid in the reservoir. The air bell may be connected via a tube to a controller positioned outside of the reservoir. The controller is operative to determine a liquid level in the tank by measuring the back pressure of the air that has been captured in an open cavity of the air bell. Based at least in part on the determined liquid level increasing or falling to one or more predetermined levels, the controller operates to cause one or more pumps and/or valves to change the amount of liquid in the reservoir to a different level. Whether the controller causes the pumps and valves to move liquid into and/or out of the reservoir will depend on the particular application. For example, for a wastewater tank, the controller is responsive to the determined level of liquid in a tank increasing to a predetermined level, to turn on a pump. The pump is turned on for a sufficient amount of time to remove a portion of the wastewater liquid out of the tank, so as to lower the amount of wastewater liquid left in the tank. However, in other applications, such as a city fountain, pond, or pool, the controller may be configured to open a valve or turn on a pump to add additional liquid such as water to a reservoir responsive to the determined level of the liquid in the reservoir falling to a predetermined level.

The example system includes an air compressor positioned outside the reservoir, which air compressor is operative responsive to the controller to pump air (or other gas) through the tube connected to the air bell. The pumping of air through the tube and into the air bell is operative to compensate for the loss of air in the tube and air bell by attrition into the liquid or by the presence of a small air leak in the system. Also, the pumping of air through the tube by the compressor can clear the tube of potential blockages and condensation buildup.

The example system may use an aquarium type compressor. These compressors are typically designed for long life at a continuous usage. The controller causes the compressor to intermittently blow out the tube into the air bell, and recharge a cavity in the air bell with a volume of air. By only intermittently operating the compressor (e.g., not continually operating the compressor), the life of the compressor may be extended. Also, in the example system, the compressor does not intermittently run to fill a pressure tank with compressed gas (e.g., air or other gas), which pressure tank then continually lets a reduced flow/amount/pressure of gas (relative the flow/amount/pressure of gas being pumped in the pressure tank) out through the tube to the air bell. Rather, when the controller turns on the compressor, the compressor directly pumps air into the tube to the air bell. Also, when the controller turns off the compressor, the air flow into the tube and air bell is stopped.

In the example system, the controller includes a pressure sensor component connected to the tube to the air bell, which pressure sensor component measures the back pressure in the tube. Such a pressure sensor component may correspond to a pressure transducer or other pressure responsive sensor. When the compressor is off, the back pressure in the tube (absent a blockage) corresponds to the depth level of the liquid in the reservoir. The controller may be operative responsive to the readings from the pressure sensor component (while the compressor is off) to determine when the level of liquid in the reservoir has reached or falls to one or more levels which trip the need for a pump, valve, alarm, and/or compressor to be operated.

However, when the compressor is running, the controller is operative to cause the readings from the pressure sensor component to be ignored and thereby to prevent the controller from causing the output of one or more alarms and/or operating one or more pumps in the system. Thus, in this described system, the air output from the compressor does not need to be regulated to produce a relatively slow continual flow of air out of the air bell (relative to the flow of air emitted from the compressor). Rather, in the example system, the compressor provides a full unregulated air flow at run time, which is operative to clear many blockages which may occur in the air bell and tube. After operating the compressor for a predetermined amount of time, the controller may stop the compressor and then start monitoring the back pressure in the tube via the pressure sensor component.

If the tube were to become blocked such that the compressor cannot clear the blockage, the example system will produce a pressurized tube. When the compressor shuts off, the controller will be responsive to the pressure sensor component detecting the pressurized tube to cause an alarm output device to output a high pressure alarm.

Various events as discussed below in more detail will cause the controller to operate the compressor to pump additional air through the tube and air bell. Other aspects will be appreciated upon reading and understanding the attached figures and description.

DETAILED DESCRIPTION

Various technologies pertaining to an example system that facilitates monitoring and control of a depth level of a liquid in a reservoir will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
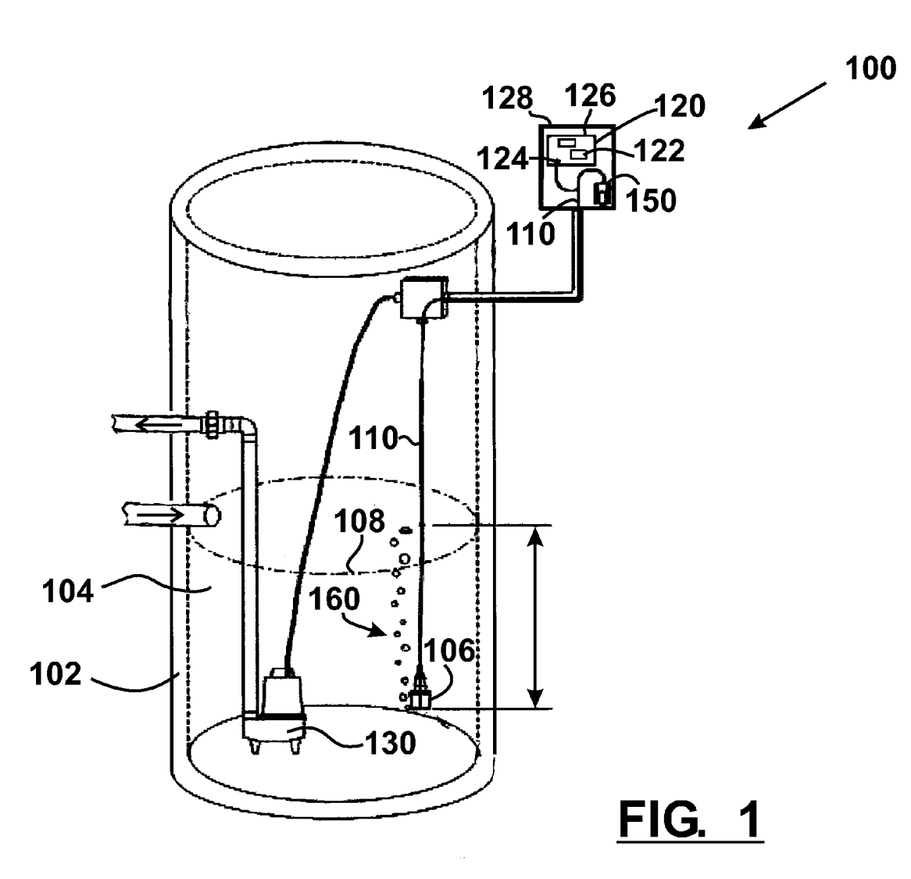
FIG. 1 is a schematic view of an example system that facilitates monitoring and control of a depth level of a liquid in a reservoir.

With reference to FIG. 1, an example system 100 that facilitates monitoring and control of a depth level of a liquid in a reservoir is illustrated. The system 100 may include a reservoir 102 capable of holding a liquid 104 therein. Such a liquid may include many different types of fluids and may include solids and semi-solids therein. For example, in a wastewater environment, the reservoir may correspond to a tank that is operative to hold a wastewater liquid including sewage from one or more dwellings. However, it is to be understood that the described systems may be used in other applications that require a depth level of a liquid to be monitored and adjusted (e.g., wells, cisterns, fountains, ponds, pools, or any other liquid-holding reservoir).

The example system 100 may include an air bell 106 mounted in the reservoir at a level that is typically below the upper surface level 108 of the liquid 104 in the reservoir. The air bell may be connected to a hollow tube 110 such as a plastic tube that extends out of the liquid. Although the air bell 106 includes the word "air" it is to be understood that the air bell 106 and the systems described herein are not limited to use with only air; rather, the air bell and described systems may be used with other individual gases or mixtures of gases.

The example system 100 also includes a controller 120. The controller may include a control component 122. In the example system, the control component 122 may correspond to a processor with appropriate software and/or firmware to cause the processor to carry out the functions of the controller described herein. However, it is to be understood that the control component may correspond to an electrical circuit that does not include software/firmware. Also, the described controller 120 may include one or more processors, and circuits to carry out the functions described herein.

The controller 120 may include a pressure sensor component 124 in operative connection with the control component 122. The pressure sensor component 124 may be connected to the tube 110 and may be operative to measure the amount of back air pressure in the tube 110. In an example system, the controller may include a common circuit board 126 that includes both the control component 122 and the pressure sensor component 124 mounted thereon. The controller circuit board may then be mounted within a water resistant housing 128 to form a control panel box. However, in alternative embodiments, the control component 122 and the pressure sensor component 124 may be mounted separately in the common housing.

In example systems, the pressure sensor component 122 may be a pressure transducer (or other sensor) that is operative to produce electrical signals representative of the current level of pressure in the tube 110 (which pressure levels are indicative of the depth level of the liquid above the air bell). The control component may be programmed and/or otherwise configured to determine a depth level of the liquid in the reservoir responsive to the signals produced by the pressure sensor component 122. In the example system, the control component 124 is operative responsive to the electrical signals from the pressure sensor component (and/or the corresponding determined depth levels of the liquid) to carry out one or more operations.

Such operations may include operating at least one liquid moving pump 130 in or otherwise connected to the reservoir to change the depth level of the liquid 104 in the reservoir. (For example, the pump 130 may be operative to pump a portion of the liquid out of the reservoir.) Such operations may also include operating at least one alarm output device to output an alarm regarding the level of liquid in the reservoir or other condition of the system. Such operations may also include operating at least one gas compressor 150 (e.g., an air pump) to pump a gas (such as air) into the tube 110 to the air bell.

With respect to the liquid-moving pump 130, the controller may include or be in operative connection with a circuit that is operative to provide power to one or more pumps 130 associated with the reservoir. The control component 120 may be programmed or otherwise configured to cause the circuit to turn the pump 130 on and off, based on the determined levels of the liquid in the reservoir measured via the pressure sensor component 124 connected to the tube 110.

With respect to the at least one alarm output device, such devices may correspond to a local alarm output device that is included on the circuit board of the controller 120 (or otherwise connected to the control component and mounted in the same housing as the controller). Also, the alarm output device may correspond to a remote alarm located remotely (e.g., in another room or building) from the controller. Examples of alarm output devices may include a visible light emitting device (e.g., a flashing light or other device operative to emit a visible light signal) and/or a sound output device (e.g., a siren or other device operative to emit an audible sound signal). The control component 120 may be programmed or otherwise configured to cause the one or more alarm output devices to turn on and off responsive to the determined levels of the liquid in the reservoir measured via the pressure sensor component 124 connected to the tube 110 and/or responsive to other conditions and/or inputs provided to the controller.

With respect to the at least one gas compressor 130, the control component 122 of the controller 120 is operative to control when the compressor 150 is turned off and on. For example, the controller 120 may include a circuit that is in operative connection with the compressor and is operative to control when the compressor is turned on (i.e., is pumping air into the tube) and when the compressor is turned off (i.e., is not pumping air into the tube). Such a compressor 150 may be located in the same housing 128 as the controller 120.

When turned on, the compressor 150 is operative to supply air or other gases directly into the tube 110 so as to create a flow of gas into the air bell 106. The compressor 150 may be operative to produce a sufficient amount of pressure to overcome any back pressure produced by the liquid in the reservoir acting on the gas supplied by the compressor to the air bell. The compressor 150 may also be operative to produce a sufficient amount of pressure to flush out clogs in the air bell and/or tube caused by condensation in the line and debris from the liquid.

In an example, the compressor 150 may correspond to an aquarium air pump or other type of pump capable of pushing air or other gases through a tube to an air bell several feet below the surface 108 of the liquid 104 in the reservoir 102. In one example system, a Commodity Axis MillionAir aquarium pump Model MA-80 was used for the described compressor 150. A tested MillionAir pump had a maximum output port pressure at room temperature of about 3.2. psi. The MillionAir pump includes an oscillating rubber diaphragm with a check valve system to pump air. For this described air pump, the maximum operating range is about 4 feet below the surface level of wastewater liquid. However, it is to be understood that the system described herein may use other types of compressors with other gas pumping capabilities, depending on the environmental conditions involved, the depth of the air bell in the liquid, and other characteristics of the reservoir and application to which the described example system is to be used.

Figures 2, 3:
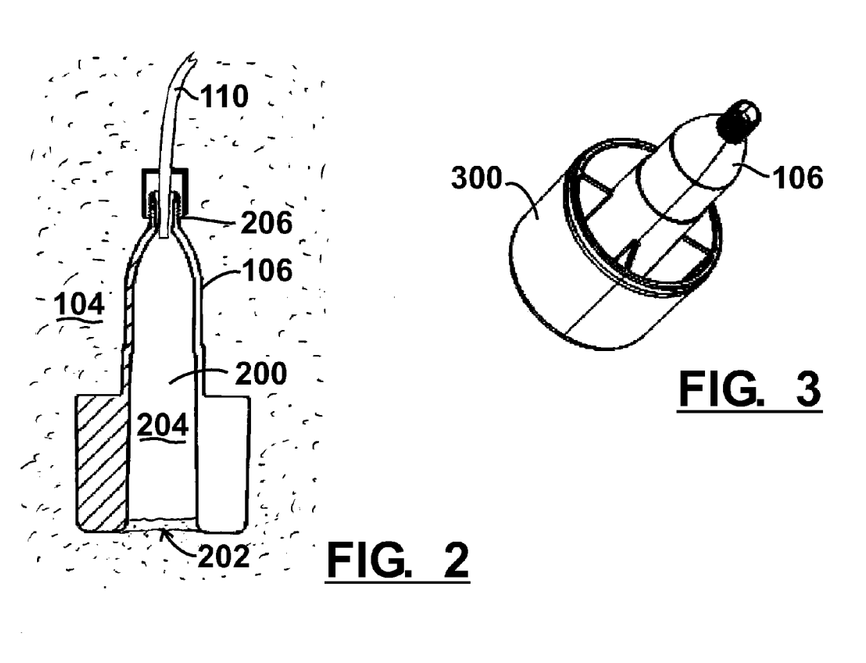
FIG. 2 is a cross-sectional view of an air bell positioned in a liquid in a reservoir.
FIG. 3 is a perspective view of the air bell.

FIG. 2 shows a cross-sectional view of an example air bell 106. Here the air bell includes a cavity 200 that is operative to be filled with a gas supplied from the tube 110. The cavity 200 includes an opening 202 thereto. When the air bell 106 is mounted in the reservoir, the opening 202 of the cavity faces downwardly. As a result, the cavity 200 is operative to hold a pocket of gas 204 therein when submerged in the liquid 104.

The top of the air bell 106 includes a port 206 to which the tube 110 is connected. The port 206 places the cavity 200 in fluid communication through the tube 110, which is in fluid communication with both the pressure sensor component 124 of the controller and the compressor 150 as shown in FIG. 1. The amount of liquid 104 in the reservoir above the opening 202 will impact the pressure detected by the pressure sensor component. For example, the higher the depth of liquid in the reservoir above the air bell, the greater the pressure that will act on of the pocket of gas 204 in the air bell, and therefore the greater the pressure that will be measured via the pressure sensor component. In an example, the inner diameter of the cavity 200 of the air bell 106 is larger than the inner diameter of the tube 110 connected to the air bell.

In addition, it is to be understood that as used herein, an air bell corresponds to any article that includes: a cavity therein operative to hold a volume of air or other gases therein while submerged in a liquid; a lower opening to the cavity that exposes the volume of air or other gasses to the liquid; and an upper port for connecting a tube in fluid communication with the cavity.

FIG. 3 shows a perspective view of the example air bell 106. The air bell may include additional weight 300 that will prevent the air bell from floating in the liquid. As shown in FIG. 3, the weight 300 may correspond to an outer cylinder that supplies additional mass (which is sufficiently dense) to keep the air bell as low in the reservoir as the tube 110 will permit the air bell to descend. However, in alternative embodiments of the air bell, the air bell may have other shapes and configurations with sufficient mass and density to keep the air bell from floating.

Referring back to FIG. 2, in the example system, the compressor when turned on is operative to supply a sufficient amount of gas at a sufficient pressure to fill the cavity 200 with the pumped gas. Filling the cavity with a gas lowers the amount of liquid that may extend into the cavity from the opening 202. When the compressor is on, excess gas will move out of the air bell 106 through the opening 202 and produce a stream of gas bubbles 160 as shown in FIG. 1.

However, the example system does not supply continuous flows of gas into the air bell 106 (e.g., for hours and days on end). Rather the controller intermittently causes a flow of gas into the air bell 106 by intermittently turning on and off the compressor 150 (e.g., running the compressor continually for less than a minute or at least less than 10 minutes). For example, the control component may be programmed or otherwise configured to cause the controller to turn on the compressor for a first predetermined run duration of time when the controller initially powers up. Such a first predetermined run duration of time may be 30 seconds, for example, or another amount of time that is typically sufficient to fully clear the tube 110 and air bell 106 of liquid, (if there is any liquid to clear).

Once the compressor stops, (and at other times when the compressor is not running) the control component is operative to continuously or periodically determine a depth level of the liquid responsive to the back pressure in the tube determined by the pressure sensor component. When the compressor is running, the pressure levels determined by the pressure sensor component have no meaningful relationship with the depth level of the liquid, and therefore are typically ignored for that purpose. When the compressor is stopped, however, the liquid level (and changes in the liquid level) determined using the pressure sensor component may then be used to determine actions to be carried out by the controller (e.g., operation of the pump, the alarm output devices, and the compressor).

After the point at which the air bell is initially filled with air, as described above, there may be several more events that can trigger the controller to cause the compressor to run again. A first event may be a pump run event. A pump run event corresponds to when the pump is turned on by the control component responsive to the liquid level in the reservoir reaching a predetermined level such as a pump run level setting (as measured from the backpressure in the tube 110). As the pump runs, the liquid level in the reservoir will decrease. Once the liquid level reaches a predetermined level such as a pump off level setting (as measured from the backpressure in the tube 110), the control component will turn the pump off and will then cause the compressor to turn on for a second predetermined run duration of time (e.g. 30 seconds or another amount of time) to ensure that the tube 110 and air bell 106 is charged (i.e., is fully filled with air) and is clear of clogs. Running the compressor at the end of the pump cycle corresponds to when the liquid level will typically be at a relatively low point in the reservoir, allowing the pressure from the compressor to be more effective.

A second event that may trigger the compressor to run is a timer. The control component may be programmed or otherwise configured to use a timer to keep track of the length of time since the last compressor run. When the time since the last run of the compressor reaches a predetermined off duration of time (e.g., 6 hours or another amount of time), the control component is operative to cause the compressor to run for a third predetermined run duration of time. Such a third predetermined run duration may be greater than the previously described first and second predetermined run durations, in order to However, if the control component determines that the measured level of the liquid after the compressor runs is greater than the predetermined threshold, the control component will set a flag in a memory indicative of a low level or possible air leak. If after this point the pump were to run responsive to the control component detecting that liquid level has risen to a predetermined level such as the previously discussed pump run level setting, the low-level flag would be cleared by the control component and the system would continue on as normal.

However, prior to the flag being cleared, if the control component determines via the pressure sensor component that the liquid level appears to have fallen again below the predetermined level (e.g., 1 inch liquid level or other level that is possibly indicative of an air leak in the system), the control component may be operative to trigger an "air leak" alarm signal, indicating a possible air leak in the system. When the air-leak alarm signal is outputted (e.g., via an alarm output device) the system may continue to run and cycle the compressor as described previously, to keep the air tube and air bell filled with air, but this alarm will notify a user that the system needs to be checked and, probably, serviced.

As discussed previously, the example system may be used in an application that uses a pump to move liquids out of a reservoir, such as is done in a wastewater system. Also, the example system may be used in applications that use a valve or pump to move liquids into a reservoir, such as with a fountain, pool, or pond. In such applications the controller may include a configurable predetermined level corresponding to a liquid add level setting. When the control component detects that the liquid level has decreased, via leaks, evaporation or other causes, to at least the liquid add level setting (as indicated by the pressure sensor component), the control component may be operative to turn on a pump or valve to add additional liquid into the reservoir. When the liquid level in the reservoir reaches a configurable predetermined level corresponding to a liquid stop level setting, the minimize clogs in the tube 110 that could interfere with the ability of the pressure sensor component 124 to acquire an accurate measure of the pressure at the air bell. For example, the third predetermined run duration for the compressor that occurs when the monitored time reaches the predetermined off duration may be 1 minute.

In the described example system, a third event that may trigger the compressor to run may be when the control component monitoring the pressure sensor component determines that the liquid level appears to have decreased to at least a predetermined level. Here the predetermined level of the liquid level may correspond to a 1 inch level of liquid in the reservoir or another level of liquid in the reservoir that may be indicative of an air leak in the system. Thus, when the liquid level appears to have decreased to this predetermined level, the control component is operative to run the compressor for a fourth predetermined run duration of time. Such a predetermined run duration of time may correspond, for example, to 30 seconds or some other amount of time to fill the tube and air bell with air.

In the example system, if this described third event occurs which triggers the compressor to run, the control component is operative to determine whether the current measured level of the liquid after the compressor runs is less than a predetermined threshold. If the current measured level of liquid after the compressor runs is less than the predetermined threshold, then the control component will continue operating in a manner that is consistent with the low liquid level being accurate (and not indicative of an air leak). Such a predetermined threshold may be greater than the predetermined level that triggered the compressor to run. In an example, the predetermined threshold may correspond to the pump off level setting discussed previously (i.e., the predetermined level that triggers when the control component stops running a pump to move liquid out of the reservoir). detection of the liquid reaching such a predetermined level (as indicated by the pressure sensor component) triggers the control component to operate the valve or pump to stop adding liquid to the reservoir.

In this described example, the control component may be operative to cause the compressor to pump gas through the tube to the air bell for a predetermined amount of time, responsive to the control component determining that the pressure sensor component in fluid communication with the tube indicates a possible decrease in the liquid level to at least a predetermined level corresponding to the liquid add level setting. After the compressor is run for the predetermined amount of time (e.g., 30 seconds), the control component may then cause the pump or valve to begin adding additional liquid to the reservoir.

The predetermined levels of liquid, durations of time, and thresholds described herein may have default values stored in software/firmware stored on the controller and/or stored in a memory associated with the control component. Also, the predetermined levels, durations, thresholds described herein may be configurable values stored in a memory or other devices of the controller that can be configured by users. For example, such values could be configured using input keys, dip switches, or any other input device on or connected to the controller which can provide the control component with information corresponding to desired values for the predetermined levels, durations, and thresholds described herein. Also it is to be understood that some of the described levels, thresholds, and durations, may correspond to the same settings and/or have the same values. For example, one or more of the predetermined run amounts of time for running a compressor may correspond to a common configurable setting. Similarly, the previously described predetermined threshold and predetermined pump off level setting may correspond to the same configurable setting.

With reference now to FIGS. 4-7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 4:
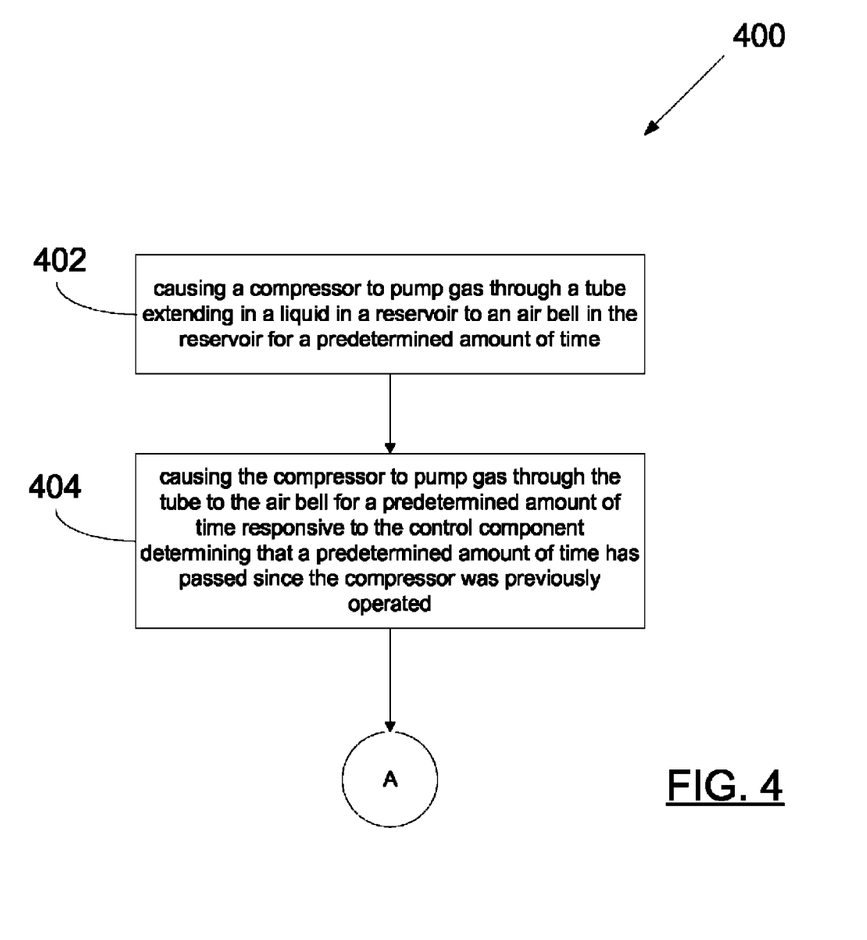
FIGS. 4-7 are flow diagrams that illustrate an example methodology for operating a compressor that pumps air or other gases to the air bell.

Referring now to FIG. 4, a methodology 400 that facilitates use of the previously described air bell 106 within a reservoir is illustrated. The methodology 400 may include an act 402 that upon the initialization of the system, includes causing a compressor to pump gas through a tube extending in a liquid in a reservoir to an air bell in the reservoir for a predetermined amount of time (e.g., 30 seconds or other amount of time) to fill the tube and air bell with air. In addition, the methodology 400 may also include an act 404 of causing the compressor to pump gas through the tube for a predetermined amount of time (e.g. 1 minute or other amount of time) to fill the tube and air bell with air, responsive to determining that a predetermined amount of time (e.g. 6 hours or other duration of time) has passed since the compressor was previously operated.

Figure 5:
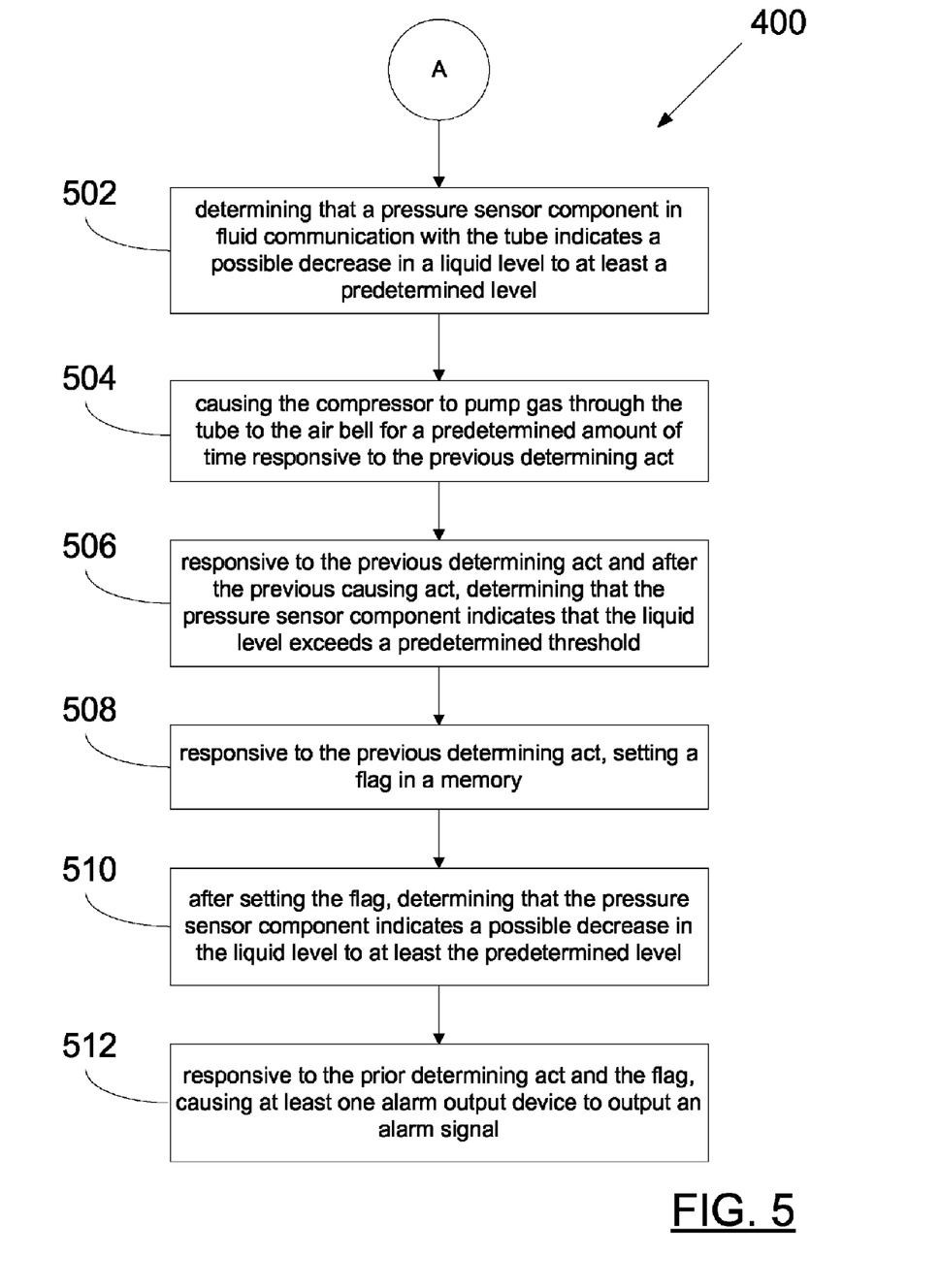

Referring now to FIG. 5, the methodology 400 may also include an act 502 of determining that the pressure sensor component in fluid communication with the tube extending in the reservoir to the air bell in the reservoir indicates a possible decrease in the liquid level in the reservoir to at least a predetermined level (e.g., 1 inch liquid level in the reservoir or other level that is possibly indicative of an air leak in the system). In addition, the methodology 400 may also include an act 504 of causing a compressor to pump gas through the tube to the air bell for a predetermined amount of time (e.g., 30 seconds or other amount of time) to fill the tube and air bell with air, responsive to the previous determining act 502. Also the methodology 400 may include, responsive to the previous determining act 502 and after the previous causing act 504, an act 506 of determining that the pressure sensor component indicates that the liquid level exceeds a predetermined threshold (e.g., a level greater than the predetermined level in act 502, such as a pump off level setting that triggers when the system is to stop a pump from pumping liquid out of the reservoir).

The detection of such an increase after refilling the air bell with gas may suggest that an air leak was responsible for the loss in pressure and not an actual decrease in the liquid level. Thus in response to act 506, the methodology 400 may include an act 508 of setting a flag in a memory indicative of a possible air leak or low liquid level. In an example, the predetermined threshold in act 506 would also typically be set to a value that is less than a pump start level setting that triggers when to start the pump that moves liquid out of the reservoir.

If there is an actual air leak, the methodology 400 may include an act 510 of determining that the pressure sensor component again indicates a possible decrease in the liquid level to at least the predetermined level in act 502. Responsive to the determining act 510 and the flag set in act 508, the methodology 400 may include an act 512 of causing at least one alarm output device to output an alarm signal.

Figure 6:
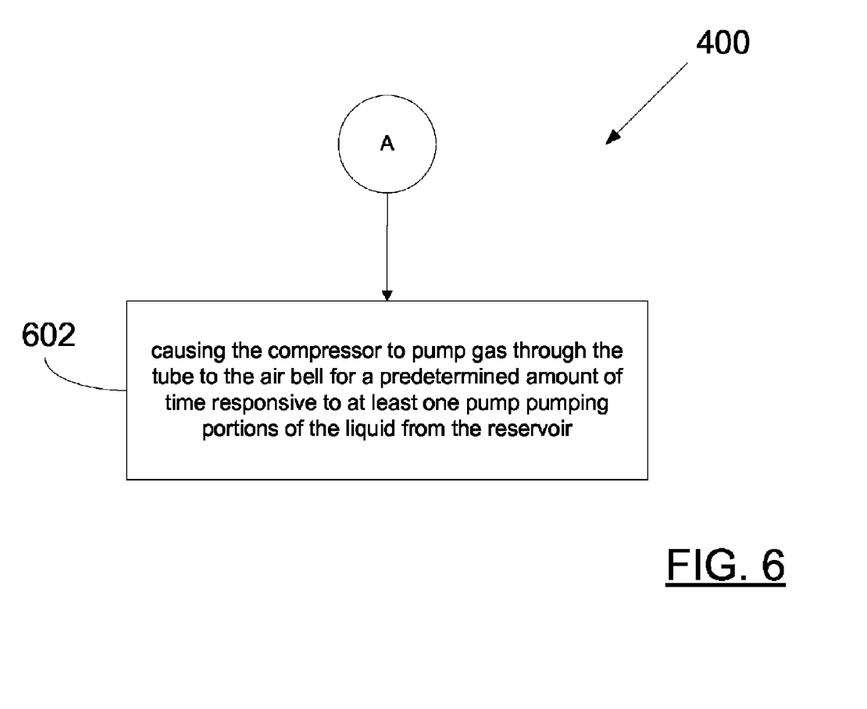

Referring to FIG. 6, the methodology 400 when used in a wastewater application may include an act 602 of causing a compressor to pump gas through the tube for a predetermined amount of time (e.g., 30 seconds or other amount of time) to fill the tube and air bell with air, responsive to at least one pump finishing pumping portions of the liquid from the reservoir.

Figure 7:
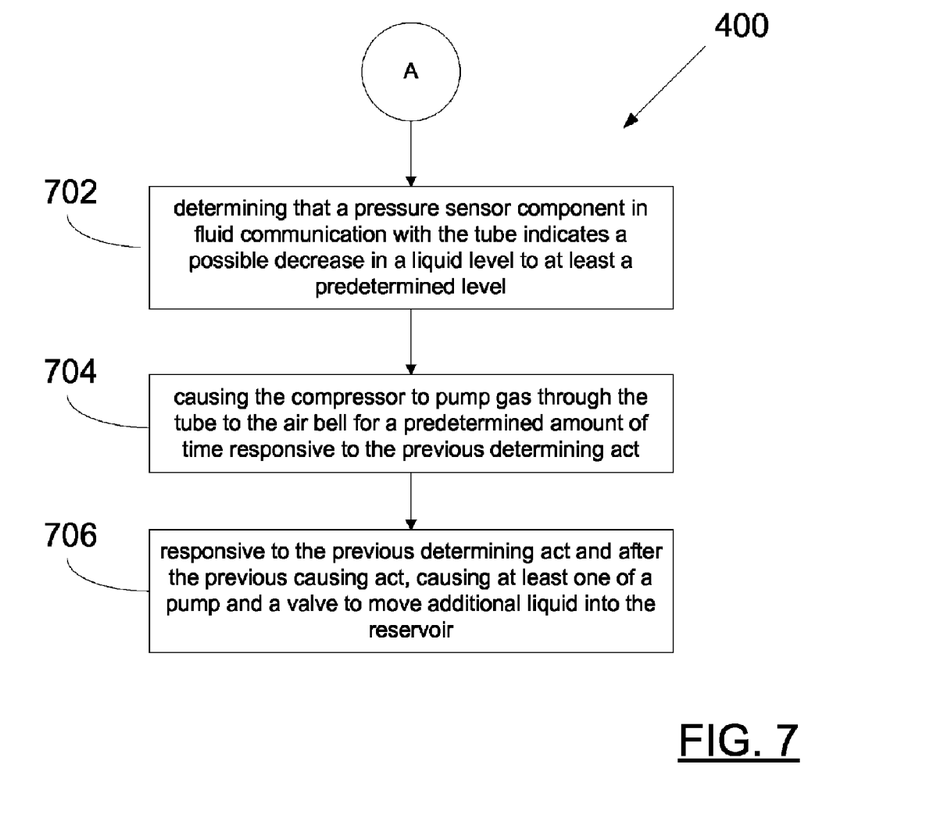

Referring to FIG. 7, the methodology 400 when used in a fountain, pond or pool application may include an act 702 of determining that a pressure sensor component in fluid communication with the tube indicates a possible decrease in the liquid level to at least a predetermined level (e.g., a liquid add level setting). Responsive to act 702 the methodology may include an act of causing the compressor to pump gas through the tube for a predetermined amount of time (e.g., 30 seconds or other amount of time) to fill the tube and air bell with air. In addition, responsive to act 702 and after act 704, the methodology may include an act 706 of operating at least one of a pump and a valve to cause additional liquid to move into the reservoir.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
    a) through operation of at least one control component, causing a compressor to pump gas through a tube extending in a liquid in a reservoir to an air bell in the reservoir for a predetermined amount of time, responsive to the control component determining that a predetermined amount of time has passed since the compressor was previously operated;
    b) through operation of the at least one control component, determining that a pressure sensor component in fluid communication with the tube indicates a possible decrease in a liquid level to at least a predetermined level;
    c) through operation of the at least one control component responsive to (b), causing the compressor to pump gas through the tube to the air bell for a predetermined amount of time.

2. The method according to claim 1, further comprising:
    d) through operation of the at least one control component responsive to (b), after (c) determining that the pressure sensor component indicates that the liquid level exceeds a predetermined threshold;
    e) responsive to (d) through operation of the at least one control component, setting a flag in a memory of the control component.

3. The method according to claim 2, further comprising:
    f) through operation of the at least one control component, determining that the pressure sensor component indicates that the liquid level has increased to at least a predetermined level;
    g) through operation of the at least one control component responsive to (f), causing at least one pump to move a portion of the liquid out of the reservoir;
    h) through operation of the at least one control component responsive to (g), clearing the flag set in (e).

4. The method according to claim 2, wherein the predetermined threshold in (d) is greater than the predetermined level in (b), wherein the predetermined threshold in (d) is less than the predetermined level in (f).

5. The method according to claim 2, further comprising:
    f) through operation of the at least one control component, after (e) determining that the pressure sensor component indicates a possible decrease in the liquid level to at least the predetermined level in (b);
    g) through operation of the at least one control component responsive to (f) and the flag, causing at least one alarm output device to output an alarm signal.

6. The method according to claim 1, wherein the control component includes a processor, wherein the reservoir is a wastewater tank, wherein the liquid is wastewater, wherein the compressor is an air pump, wherein the gas is air.

7. The method according to claim 1, wherein in (a) the predetermined amount of time that the compressor pumps gas through the tube to the air bell is less than the determined predetermined amount of time that has passed since the compressor was previously operated in (a).

8. The method according to claim 1, further comprising:
    d) through operation of the at least one control component, causing the compressor to pump gas through the tube to the air bell for a predetermined amount of time responsive to at least one pump pumping portions of a liquid from the reservoir.

9. The method according to claim 1, further comprising:
d) through operation of the at least one control component responsive to (b), after (c) operating at least one of a pump and a valve to cause additional liquid to move into the reservoir.

10. A method, comprising:
a) through operation of at least one control component, determining that a pressure sensor component in fluid communication with a tube extending in a reservoir to an air bell in the reservoir indicates a possible decrease in a liquid level in the reservoir to at least a predetermined level;
b) through operation of the at least one control component responsive to (a), causing a compressor to pump gas through the tube to the air bell for a predetermined amount of time;
c) through operation of the at least one control component responsive to (a), after (b) determining that the pressure sensor component indicates that the liquid level exceeds a predetermined threshold;
d) through operation of the at least one control component responsive to (c), setting a flag in a memory;
e) through operation of the at least one control component, after (d) determining that the pressure sensor component indicates a possible decrease in the liquid level to at least the predetermined level in (a);
f) through operation of the at least one control component responsive to (e) and the flag, causing at least one alarm output device to output an alarm signal.

11. The method according to claim 10, wherein the predetermined threshold in (b) is greater than the predetermined level in (a).

12. The method according to claim 10, further comprising:
g) through operation of the at least one control component, causing the compressor to pump gas through the tube to the air bell for a predetermined amount of time responsive to at least one pump pumping portions of the liquid from the reservoir.

13. The method according to claim 10, further comprising:
g) through operation of the at least one control component, causing the compressor to pump gas through the tube to the air bell for a predetermined amount of time, responsive to the control component determining that a predetermined amount of time has passed since the compressor was previously operated.

14. A computer-readable medium comprising instructions that, when executed by at least one processor, perform the following acts:
a) determining that a pressure sensor component in fluid communication with a tube extending in a reservoir to an air bell in the reservoir indicates a possible decrease in a liquid level in the reservoir to at least a predetermined level;
b) responsive to (a), causing a compressor to pump gas through the tube to the air bell for a predetermined amount of time;
c) responsive to (a), after (b) determining that the pressure sensor component indicates that the liquid level exceeds a predetermined threshold;
d) responsive to (c), setting a flag in a memory;
e) after (d), determining that the pressure sensor component indicates a possible decrease in the liquid level to at least the predetermined level in (a);
f) responsive to (e) and the flag, causing at least one alarm output device to output an alarm signal.

15. A computer-readable medium comprising instructions that, when executed by a processor, perform the following acts:
a) causing a compressor to pump gas through a tube extending in a liquid in a reservoir to an air bell in the reservoir for a predetermined amount of time responsive to determining that a predetermined amount of time has passed since the compressor was previously operated;
b) determining that a pressure sensor component in fluid communication with the tube indicates a possible decrease in the liquid level to at least a predetermined level;
c) responsive to (b), causing the compressor to pump gas through the tube to the air bell for a predetermined amount of time.

* * * * *

UNITED STATES PATENT AND TRADEMARK OFFICE
CERTIFICATE OF CORRECTION

| | | |
|---|---|---|
| PATENT NO. | : 8,032,256 B1 | Page 1 of 1 |
| APPLICATION NO. | : 12/425989 | |
| DATED | : October 4, 2011 | |
| INVENTOR(S) | : Aaron Wolfe and William D. Chandler, Jr. | |

It is certified that error appears in the above-identified patent and that said Letters Patent is hereby corrected as shown below:

Title Page, Item (75) Inventors:
Replace "Aaron Wolf" with --Aaron Wolfe--.

Signed and Sealed this
Fourteenth Day of February, 2012

David J. Kappos
*Director of the United States Patent and Trademark Office*